United States Patent [19]

Sugahara et al.

[11] Patent Number: 4,803,347

[45] Date of Patent: Feb. 7, 1989

[54] AUTOMATIC TRANSACTION MACHINE

[75] Inventors: Youji Sugahara, Otsu; Hideyuki Matsumura, Shiga, both of Japan

[73] Assignee: Omron Tateisi Electronics Co., Kyoto, Japan

[21] Appl. No.: 29,895

[22] Filed: Mar. 25, 1987

[30] Foreign Application Priority Data

Mar. 25, 1986 [JP] Japan .................................. 61-67677

[51] Int. Cl.[4] .............................................. G06F 15/30

[52] U.S. Cl. ..................................................... 235/379

[58] Field of Search ................................ 235/379, 380

[56] References Cited

U.S. PATENT DOCUMENTS 4,359,630 11/1982 Simonotti et al. .................. 235/379

4,538,056 8/1985 Young et al. ....................... 235/380

FOREIGN PATENT DOCUMENTS 250470 12/1985 Japan .................................. 235/379

*Primary Examiner*—Roy N. Envall, Jr.

*Attorney, Agent, or Firm*—Stevens, Davis, Miller & Mosher

[57] ABSTRACT

Disclosed is an automatic transaction machine which normally operates in an oil-line mode with a central station. If during the course of a transaction a communications interruption occurs between the machine and central station, the transaction can be completed off-line with storage at the machine of the off-line transaction data for later transmission to the central station for account updating.

8 Claims, 5 Drawing Sheets

AUTOMATIC TRANSACTION MACHINE

BACKGROUND OF THE INVENTION

1. Field of the Invention

The present invention relates to an automatic transaction machine which performs bank deposit and withdrawal functions without the aid of a clerk and, more particularly, to an automatic transaction machine which executes transactions on an off-line basis when there is a communications interruption between the machine and a central station.

2. Brief Discussion of the Prior Art

Automatic transaction machines inclusive of automatic deposit-withdrawal machines installed in banks and similar institutions (hereinafter referred to briefly as an ATM) are connected to their respective processing centers, containing usually a host computer, via communication lines. The center (also termed central station) carries a deposit account file where the deposit account of each customer is registered and each terminal machine transmits transaction data to this center and after the data in this deposit account file has been updated according to the data, executes a transaction with the customer. In this manner, the automatic transaction machine is connected on-line to the center so that the updating of a deposit account file and the requested transaction can be carried out on a real time basis. However, when communication trouble occurs during the course of a transaction and the automatic transaction machine cannot have access to the center, the machine is brought into a "down" condition and has to discontinue the transaction with the customer. Moreover, since such a "down" condition may occur, either before or after updating of the deposit account file at the center, a clerk must rush to the terminal machine to send an enquiry to the center to determine the stage at which the transaction was discontinued and, depending on the stage, must judge whether the transaction is to be cancelled or is to be manually continued to completion. Thus, the provision of a clerk has been an essential requisite. Since the machine may be brought into a "down" condition by communications line trouble, despite the fact that the machine itself is functioning properly, and because a clerk is required for recovery, the machine cannot be exploited to full advantage at an automated banking premises, or on holidays.

OBJECTS AND SUMMARY OF THE INVENTION

The present invention has as its object to provide an automatic transaction machine which, even in the event of communications line trouble, may execute a transaction off-line and, also, perform updating of the center file with the off-line transaction data, when the communications line is restored, all automatically.

The present invention achieves the foregoing object in an automatic transaction machine which comprises a means for performing preliminary operations such as identification of the customer, recognition of the proposed amount of transaction, and so on, a means for transmitting information from the customer to a center having a deposit account file through a communications line for updating the deposit account file, a means for executing on-line a transaction based on information received from the customer and from the center, an off-line transaction means for performing the transaction off-line upon an absence of communications with the center, and an off-line transaction memory means for storing transaction data relevant to the off-line transaction. The machine also preferably comprises a means for enquiring, upon recovery of communications with the center, if a deposit account file has been updated by the transaction data stored in the off-line transaction memory means, and a means for transmitting the transaction data to the center when the deposit account file has not been updated.

The present invention thus has the following advantages. Even in the event that the machine cannot communicate with the center due to communications line trouble, it may consummate the requested transaction on an off-line basis. In addition, although communications line trouble in the course of a transaction may occur either before or after the updating of the deposit account file at the center, an enquiry is made to the center upon recovery of the communications line and the transaction data stored in the off-line transaction memory means is transmitted to the center only when the file has not been updated as yet, with the result that double updating and the failure to update the deposit account file is eliminated.

In this manner, the machine is not brought into a "down" condition by an interruption in communications with the center and, upon recovery of communications, the deposit account file at the center is checked and automatically updated if necessary, so that the reliability of the system, without requiring a clerk at an automatic banking premises or on holidays, is increased.

BRIEF DESCRIPTION OF THE DRAWINGS

The above and other objects, features and advantages of the invention will be more readily apparent from the following detailed description of the invention which is provided in connection with the accompanying drawings in which:

FIG. 4 (B) is a partial elementary diagram of a storage area of the floppy disk mounted in the same ATM.

DETAILED DESCRIPTION OF THE INVENTION

Figure 2:
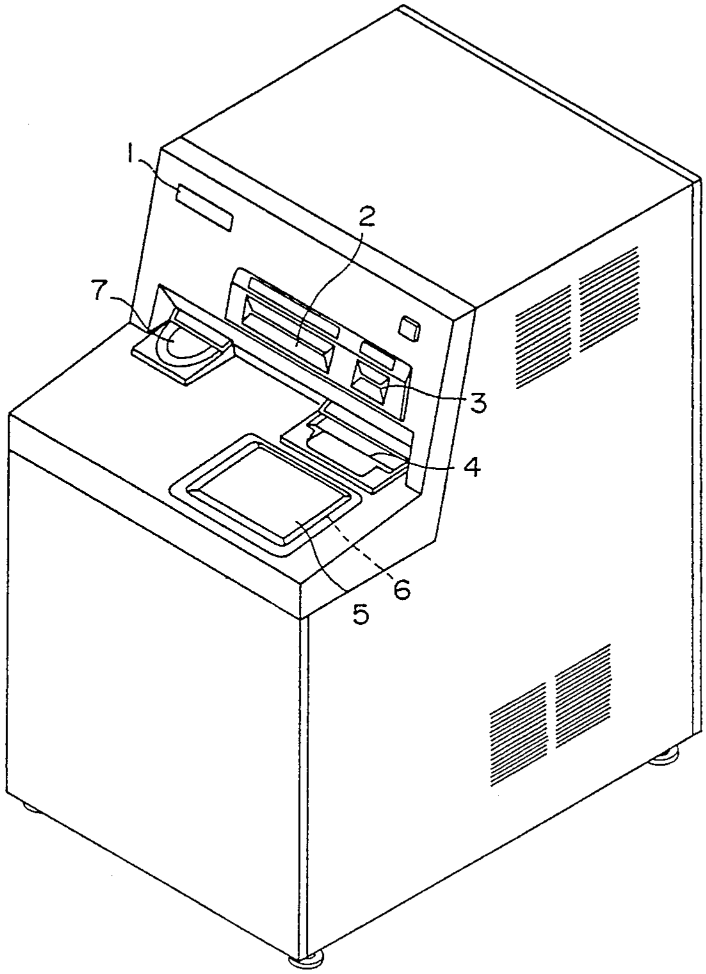
FIG. 2 is an exterior view of the same ATM.

FIG. 2 is an exterior view showing an ATM embodying the principle of the invention. Disposed on an upright panel of a customer-operated face of this ATM are an operation display 1 for indicating whether the machine is occupied or not, a bankbook slot 2 adapted to receive and take in a bankbook, and a card slot 3 for accepting a cash card. Disposed on the table panel of the same customer-operated face are a banknote slot 4 adapted to receive and dispense banknotes, a CRT 5, and a coin slot 7. Mounted on the surface of CRT 5 is a touch switch panel 6 which senses the touch of a finger or the like and the position of the touch. At each stage of a transaction, at least one of type-of-transaction select keys and a ten-key key pattern are displayed on the CRT 5 and the customer's depression of such keys is detected by the touch switch panel 6.

Figure 3:
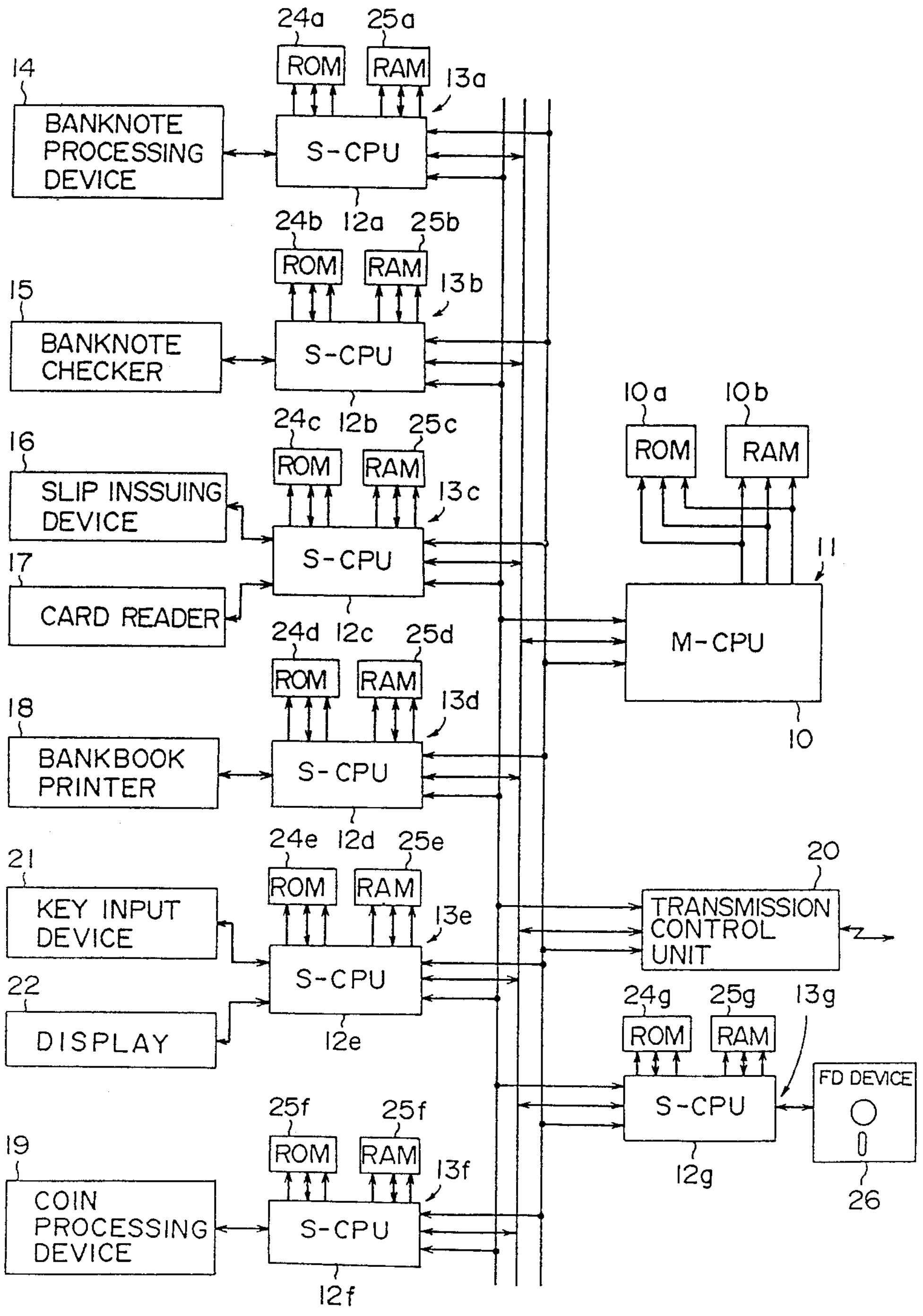
FIG. 3 is a block diagram of the control segment of the same ATM.

FIG. 3 is a block diagram of the control segment of the ATM. This control segment is based on a master-slave system. A main control unit 11 is provided which consists of a master CPU (M-CPU) 10, a ROM 10*a* which stores a control program and a RAM 10*b*. Auxiliary control units 13*a* through 13*g* connected to input and output devices via internal bus lines are connected to the main control unit 11. The auxiliary control units 13*a* through 13*g* respectively consist of slave CPU's (S-CPU) 12*a* through 12*g*, ROM's 24*a* through 24*g* which store the operational programs of respective S-CPU's, and RAM's 25*a* through 25*g* which store the various input and output data for each of the S-CPU's. Connected to the auxiliary control unit 13*a* is a banknote processing device 14 for counting the banknotes to be paid out and distributing them to the banknote slot 4. The auxiliary control unit 13*b* is connected to a banknote checker 15 and adapted to find non-genuine banknotes which may be deposited into the banknote slot 4. The auxiliary control unit 13*c* is connected to a slip issuing device 16 for issuing an itemized transaction statement, and a card reader 17. Connected to the auxiliary control unit 13*d* is a bank book printer 18. The auxiliary control unit 13*e* is connected to a key-input device 21 including the touch switch panel 6 and a display device 22 including CRT 5. The auxiliary control unit 13*f* is connected to a coin processing device 19 which controls the reception and dispensing of coins at the coin slot 7. Connected to the auxiliary control unit 13*g* is a floppy disk device 26 in which an off-line transaction memory area (to be described hereinafter) is established to store the relevant transaction data in the event that the tansaction is consummated off-line. Further, the internal buses are connected to a transmission control unit 20 which communicates with a central station via a communications line, e.g., a dedicated line.

Figure 4A:
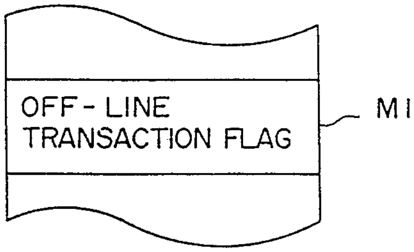
FIG. 4 (A) is a partial elementary diagram of a storage area of the main control unit RAM of the above ATM.
Figure 4B:
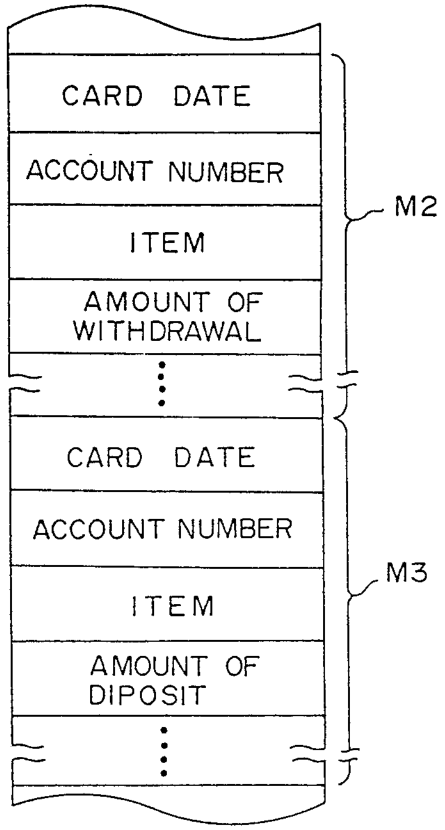

FIG. 4 (A) is a partial elementary diagram illustrating the above-mentioned RAM 10*b*. Area M1 (Area Mi will hereinafter be referred to briefly as Mi) is an off-line transaction flag storage area. In the event the communication with the center is interrupted by communications line trouble, the ATM of the invention performs the transaction off-line and the off-line transaction flag is a flag for storing an indication that such an off-line transaction has been made. This flag is reset when the deposit account file at the center has been updated with the off-line transaction data or upon confirmation that the file has already been updated.

FIG. 4 (B) is a partial elementary diagram of the floppy disk which is in the floppy-disk device 26, showing an off-line transaction memory area. This off-line transaction memory area consists of a withdrawal memory area (M2) and a deposit memory area (M3), each being adapted to store the card data, deposit account number, item, the amount of withdrawal or deposit, and other data. These data are identical with the data used to compose the message to be sent to the center for normal on-line transaction processing. When trouble occurs in the communications line connection to the central station and the transaction is consummated off-line, the relevant transaction data is stored in this area in lieu of a message to be set to the center, and upon recovery of the communications line connection to the center, an enquiry is made to the center whether the transaction data has already been entered into the deposit account file (whether the deposit account file has been updated) and, if not, the data is sent to the center. This enquiry is made to preclude the chance of double updating, for it may happen that the data on the transaction during the processing, of which a communications line trouble has occurred, has already been sent to the center. A plurality of such areas have been established in order to memorize the data on a plurality of transactions. Upon recovery of the communications line, the data stored in this area is transmitted to the center and, then, cleared.

Figure 1A:
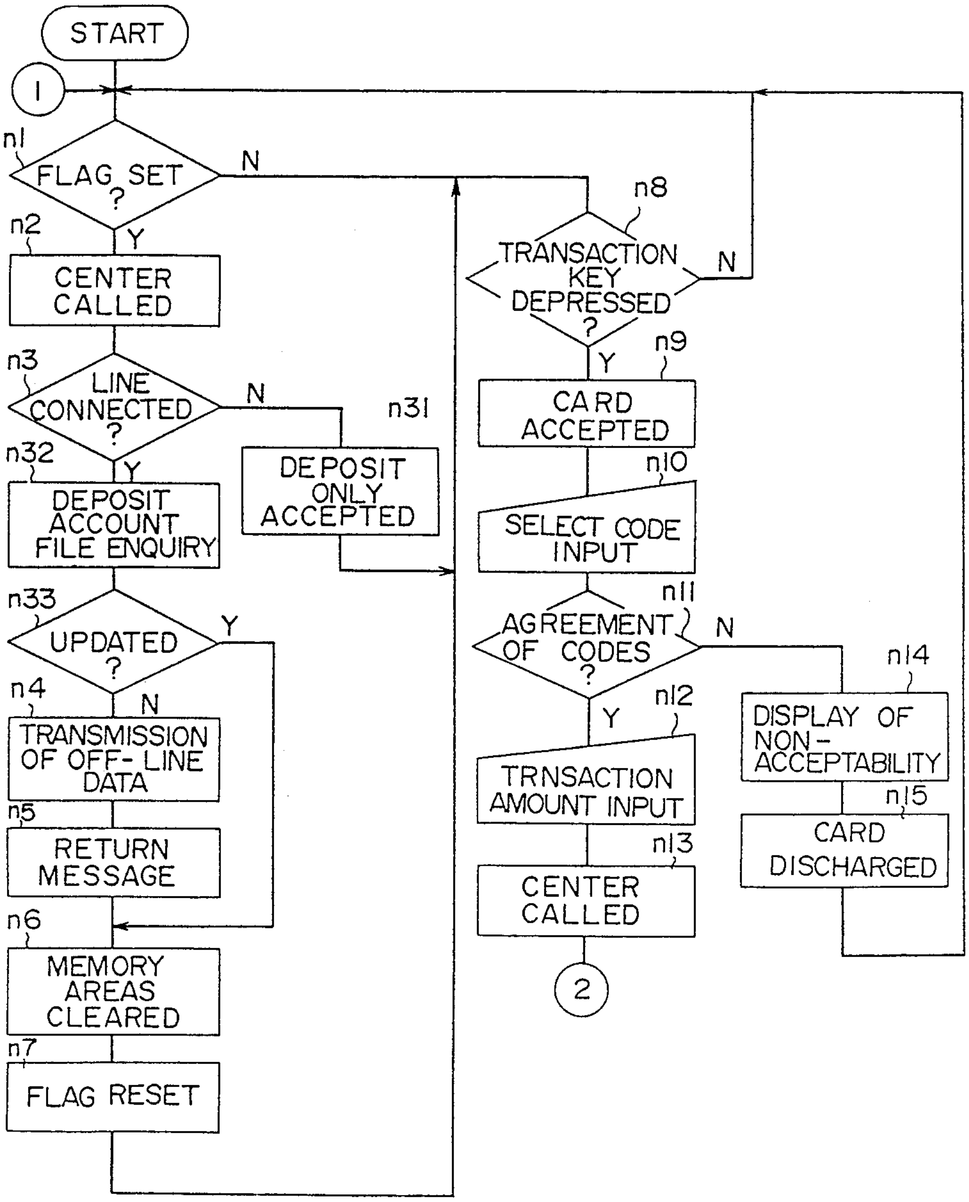
FIG. 1 (A and B) is a flow chart showing the operation of an ATM embodying the principle of the invention.
Figure 1B:
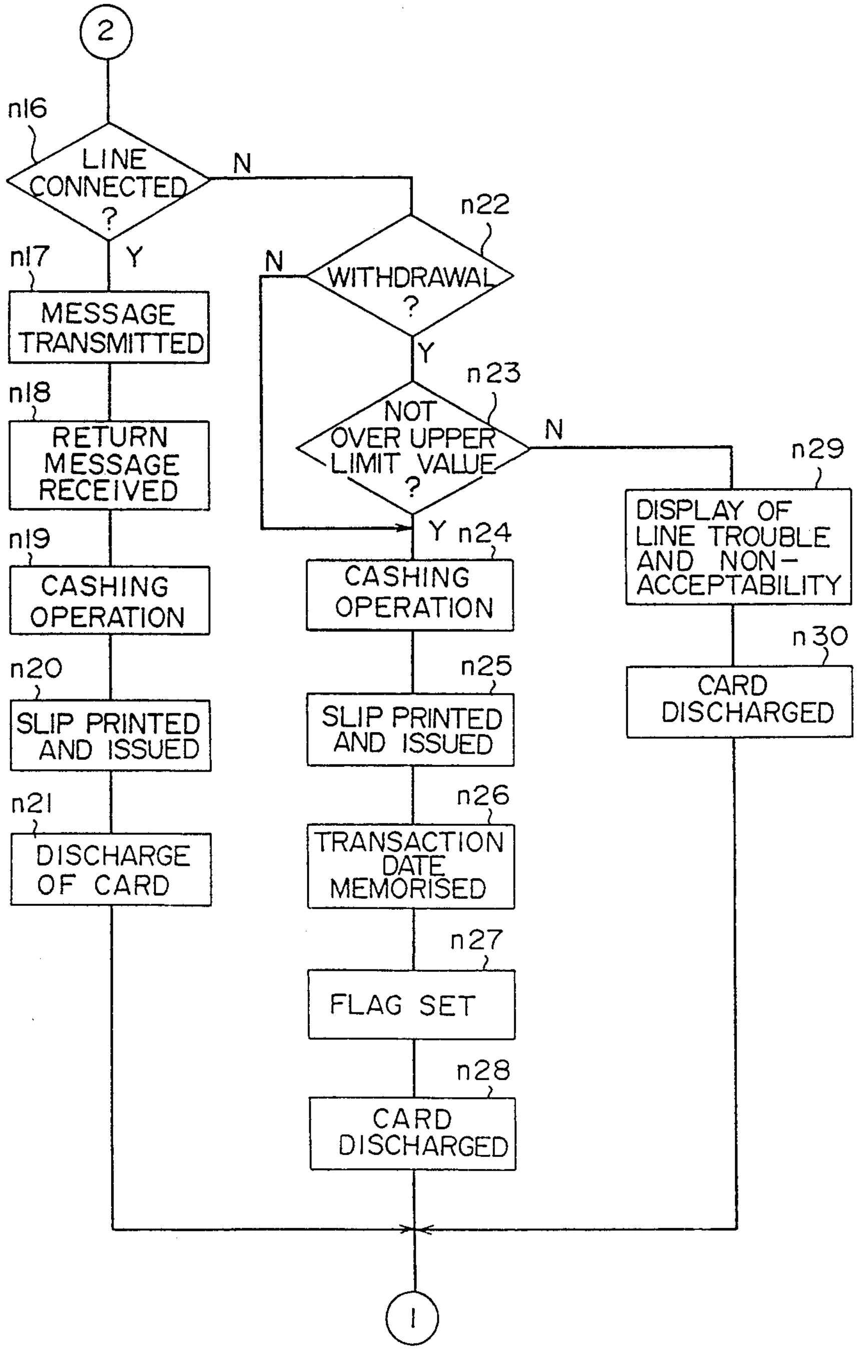

FIG. 1 is a flow chart showing the operation of the above ATM. In step nl (step ni will hereinafter be referred to briefly as ni), it is judged whether the off-line transaction flag (M1) has been set. If the flag has been set, it is assumed that the off-line transaction data has been stored in the off-line transaction area (M2, M3) and the center is called for transmission of the data (n2). If the communications line to the center is connected upon this call (n3), an enquiry (n32) is made to the center concerning whether the deposit account file has already been updated with the transaction data stored in the off-line transaction memory area (M2, M3). If the center responds with a signal indicating that updating has not yet occurred it is determined in n33 that the updating remains yet to be done, and the sequence proceeds to n4, where the off-line transaction data is transmitted to the center (n4). If a return message informing the ATM of the completion of updating is received from the center (N5), the off-line transaction memory area (M2, M3) is cleared and the off-line transaction flag (M1) is reset (n7). Then, the sequence returns to the idle routine composed of n1 through n8. When the deposit account file has already been updated with the transaction data stored in the off-line transaction memory area (M2, M3), the sequence proceeds from n33 directly to n6.

On the other hand, in the event that the above-mentioned communications line communication to the center cannot be obtained as detected in n3, the mode for selective acceptance of a deposit transaction is selected (n31) and the sequence returns to the above-mentioned idle routine.

In n8, which is entered when the off-line transaction flag has not been set, it is judged whether any one of the transactions displayed on CRT 5 has been selected by key depression. In the absence of a key depression, the sequence returns to nl for repetition of the idle routine. If a transaction key has been depressed, the sequence proceeds to n9 and the machine accepts the card inserted into the card slot 3. After insertion of the card, the ten-key is displayed on the CRT 5 for acceptance of a secret code input (n10). The inputted secret code is compared with the secret code information on the inserted card and if an agreement is found in n11, the sequence proceeds to n12. In the case of non-agreement, the sequence proceeds to n14, where the non-acceptability of the proposed transaction is indicated on the CRT 5, the card is returned (n15), and the idle routine resumes.

In n12, the transaction amount input from the ten-key on the CRT 5 is accepted (n12) and the transmission control unit 20 is driven to call the center (n13). If this call results in connection of the communications line to the center (n16), the sequence proceeds to n17. In n17, a message containing the transaction data is transmitted to the center. If, in response to this message, a return message informing of the completion of file updating is received from the center (n18), the machine performs a cashing operation such as the release or acceptance of cash (n19), prints and delivers a transaction slip (n20)

and discharges the card (n21), followed by a return to the above-mentioned idle routine. If in n18 a return message is not received after a predetermined time, indicating a failure in the communications line, the sequence proceeds to n22.

In the event that the communications line connection cannot be obtained as determined in n16, or is lost during communications, as determined in n18, it is enquired in n22 whether the particular transaction is a withdrawal or not. If it is found to be a withdrawal transaction, it is inquired whether the amount of withdrawal so requested is below an allowable upper limit (this upper limit value has been previously set by a clerk) (n23). If the requested amount exceeds this upper limit value, the non-acceptability of the requested transaction is indicated (n29) and the card is discharged back (n30), followed by a return to the idle routine.

In the event that the requested amount of a withdrawal does not exceed the upper limit value, or in the case of a deposit transaction, the sequence proceeds to n24 and, without connection of the communications line to the center, the particular withdrawal or deposit transaction is consummated (n24). The slip form is printed with an indication to the effect that this is an off-line transaction and issued out (n25), the transaction data is memorized in the above-mentioned off-line transaction data memory areas (n26), the off-line transaction flag is set (n27), and the card is discharged (n28). The sequence then returns to the above-mentioned idle routine.

The steps n24 and n25 correspond to the off-line transaction means according to the present invention, and the above-mentioned off-line transaction memory area (M2, M3) and step n26 corresponds to the off-line transaction memory means according to the present invention. Further, n32 corresponds to the means for enquiring whether the deposit account file has been updated or not and n4 corresponds to the means for transmitting the transaction data to the center.

Thus, with this ATM, even when communications between the machine and the center are interrupted by communications line trouble, the transaction can be consummated off-line so that the machine down time can be minimized. Furthermore, when an off-line transaction has been carried out, an enquiry is made to the center whether the deposit account file has been updated or not and the off-line transaction data is transmitted to the center only when the updating of the file remains yet to be done, with the result that the risk of double updating of the deposit account file based on the same transaction data can be eliminated. Moreover, once the off-line mode is entered, the center is called during the idle routine and if the communication line connection has not recovered as yet, only a deposit transaction is accepted, thus eliminating the risk of continuing the off-line withdrawal transaction.

Although a preferred embodiment of the invention has been described and illustrated, it should be apparent that many modifications can be made without departing from the spirit and scope of the invention. Accordingly, the invention is not limited by the foregoing description, but is defined solely by the following claims.

We claim:

1. An automatic transaction machine for executing customer transactions and communicating with a central station, said machine comprising:
- means for receiving identifying data identifying a customer;
- means for receiving a transaction amount;
- means for receiving information concerning a desired transaction;
- means for initiating an on-line transaction communication with said central station over a communications link;
- means responsive to establishment of said on-line transaction communication with a central station for transmitting data including at least said identifying data and transaction amount over said communications link to said central station for updating an account file corresponding to said identificant data thereat;
- means responsive to a first signal received from said central station indicating an updating of said account file for completing said desired transaction on-line;
- means responsive to an absence of an on-line communication with said central station, after said on-line communication is initiated, for completing said desired transaction off-line; and
- an off-line transaction memory means operative when said machine completes said desired transaction off-line for storing data concerning a completed off-line transaction for later transmission to said central station.

2. An automatic transaction machine as in claim 1, wherein said means for completing said desired transaction off-line sets said machine in an off-line mode.

3. An automatic transaction machine as in claim 2, futher comprising:
- means operative upon establishment of communications with said central station for enquiring of said central station if said account file has been updated by transaction data stored in said off-line transaction memory means; and
- means responsive to a second signal from said central station indicating that said account file has not been updated for transmitting said transaction data from said off-line transaction memory means to said central station.

4. An automatic transaction machine as in claim 3, further comprising means responsive to receipt of a third signal from said central station indicating the updating of said account file, after said transaction data is transmitted thereto, for clearing said transaction data from said off-line transaction memory means.

5. An automatic tansaction machine as in claim 4, further comprising means responsive to receipt of one of said second and third signals indicating the updating of said account file for setting said machine in an on-line mode.

6. An automatic transaction machine as in claim 1, wherein said means for completing said desired transaction off-line further comprises:
- means for determining whether a desired transaction is a deposit or withdrawal;
- means responsive to a determination that the desired transaction is a withdrawal for determining if the transaction amount is below an allowable upper limit; and
- means for permitting completion of said desired transaction if said transaction is a withdrawal and the transaction amount is below said allowable upper limit, or if said transaction is a deposit.

7. An automatic transaction machine as in claim 1, wherein said means for completing said transaction off-line includes means for issuing a printed record of said off-line transaction which contains an indication that said transaction was completed off-line.

8. An automatic transaction machine as in claim 2, further comprising means operative when said machine is in said off-line mode for attempting to establish communications with said central station and in response to a failure to establish said communications for further operating said machine off-line to execute only deposit transactions.

* * * * *